(12) United States Patent
Shepherd

(10) Patent No.: US 8,169,732 B2
(45) Date of Patent: May 1, 2012

(54) REDUCING WRITTEN-IN ERRORS IN SERVO PATTERNS

(76) Inventor: Stanley H. Shepherd, Morgan Hill, CA (US)

( * ) Notice: Subject to any disclaimer, the term of this patent is extended or adjusted under 35 U.S.C. 154(b) by 689 days.

(21) Appl. No.: 12/008,144

(22) Filed: Jan. 8, 2008

(65) Prior Publication Data

US 2009/0175147 A1  Jul. 9, 2009

(51) Int. Cl.
*G11B 21/02* (2006.01)
(52) U.S. Cl. ............ 360/75; 360/77.04; 360/77.08
(58) Field of Classification Search .............. None
See application file for complete search history.

(56) References Cited

U.S. PATENT DOCUMENTS

| | | | |
|---|---|---|---|
| 5,668,679 A | 9/1997 | Swearinger et al. | |
| 6,049,440 A | 4/2000 | Shu | |
| 6,519,107 B1 * | 2/2003 | Ehrlich et al. | 360/75 |
| 6,714,371 B1 * | 3/2004 | Codilian | 360/60 |
| 7,027,242 B1 * | 4/2006 | Terrill et al. | 360/31 |
| 7,158,325 B1 * | 1/2007 | Hu et al. | 360/69 |
| 7,224,548 B1 * | 5/2007 | Emo | 360/78.04 |
| 7,602,575 B1 * | 10/2009 | Lifchits et al. | 360/75 |

* cited by examiner

*Primary Examiner* — Will J Klimowicz
*Assistant Examiner* — Emily Frank

(57) ABSTRACT

A method for writing servo onto a disk of a hard disk drive. The method includes writing a plurality of spiral servo signals with a head. The spiral servo signals are used to generate position error signals and write a plurality of servo patterns. A write current of the head is varied for at least one servo pattern. A PES/WC relationship between the position error signals and the write current is determined and a plurality of final servo patterns are written by utilizing the PES/WC relationship and varying the write current. Varying the write current changes the trailing edge of the servo bits and controls the position of the track center. The PES/WC relationship allows the system to compensate for excursions within a single revolution of the disk.

10 Claims, 6 Drawing Sheets

REDUCING WRITTEN-IN ERRORS IN SERVO PATTERNS

BACKGROUND OF THE INVENTION

1. Field of the Invention

The present invention relates to a method for writing servo onto disks of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGAs are suspended from an actuator arm. The actuator arm has a voice coil motor that can move the heads across the surfaces of the disks.

Information is typically stored in radial tracks that extend across the surface of each disk. Each track is typically divided into a number of segments or servo sectors. The voice coil motor and actuator arm can move the heads to different tracks of the disks.

FIG. 1 shows a typical track that has a number of fields associated with each servo sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and used to position the head 7 relative to the track.

The fields 1-5 must be written onto the disk surfaces during the manufacturing process of the disk drive. These fields are typically written with a servo writer. The servo tracks are sometimes written using a number of spiral servo tracks initially written onto the disks. FIG. 2 shows an example of a number of spiral servo tracks written onto a disk. Using spiral servo tracks is sometimes referred to as an Ammonite servo write process. The spiral servo tracks are used to write the final radial servo tracks that are utilized during the normal operation of the disk drive. This process is described in U.S. Pat. No. 5,668,679 issued to Swearingen et al.

As shown in FIG. 3, the disk has a plurality of spiral servo patterns incrementally spaced across the surface of the disk. To write servo the servo writer reads the disk to detect a spiral servo signal. The servo writer uses the detected spiral servo signal to time the writing of a permanent A, B, C and D servo burst pattern.

The final (radial) servo patterns are written utilizing a position error signal ("PES") generated from the spiral servo signals. The mechanical system of the drive and servo writer limit the system's ability to rapidly respond to excursions in the position of the writer during the writing process. As a result, such excursions typically extend over many sectors, comprising a significant fraction of a revolution. Such excursions lead to errors in the servo patterns' written position.

Errors in writing the servo patterns are typically minimized by repeatedly writing the patterns on the same track. The final position of each servo pattern of the disk track represents the maximum excursion during all writes to that pattern. (The variation in the maximum of several random values is less than the variation in an individual value.)

Because successive servo patterns are written in sequence, residual variations in the final position from one servo sector to the next are also minimized, except for possible discontinuities at the beginning or end of a writing sequence. It would be desirable to provide a technique that can avoid these discontinuities as well, and that can rapidly respond to excursions, for example within a small fraction of a revolution of the disk.

BRIEF SUMMARY OF THE INVENTION

A method for writing servo onto a disk of a hard disk drive. The method includes writing a plurality of spiral servo signals with a head. The spiral servo signals are used to generate position error signals and write a plurality of servo patterns. A write current of the head is varied for at least one servo pattern. A PES/WC relationship between the position error signals and the write current is determined and a plurality of final servo patterns are written by utilizing the PES/WC relationship and varying the write current.

DETAILED DESCRIPTION

Disclosed is a method for writing servo onto a disk of a hard disk drive. The method includes writing a plurality of spiral servo signals with a head. The spiral servo signals are used to generate position error signals and write a plurality of servo patterns. A write current of the head is varied for at least one servo pattern. A PES/WC relationship between the position error signals and the write current is determined and a plurality of final servo patterns are written by utilizing the PES/WC relationship and varying the write current. Varying the write current changes the trailing edge of the servo bits and controls the position of the track center. The PES/WC relationship allows the system to compensate for excursions within a single revolution of the disk.

Figure 4:
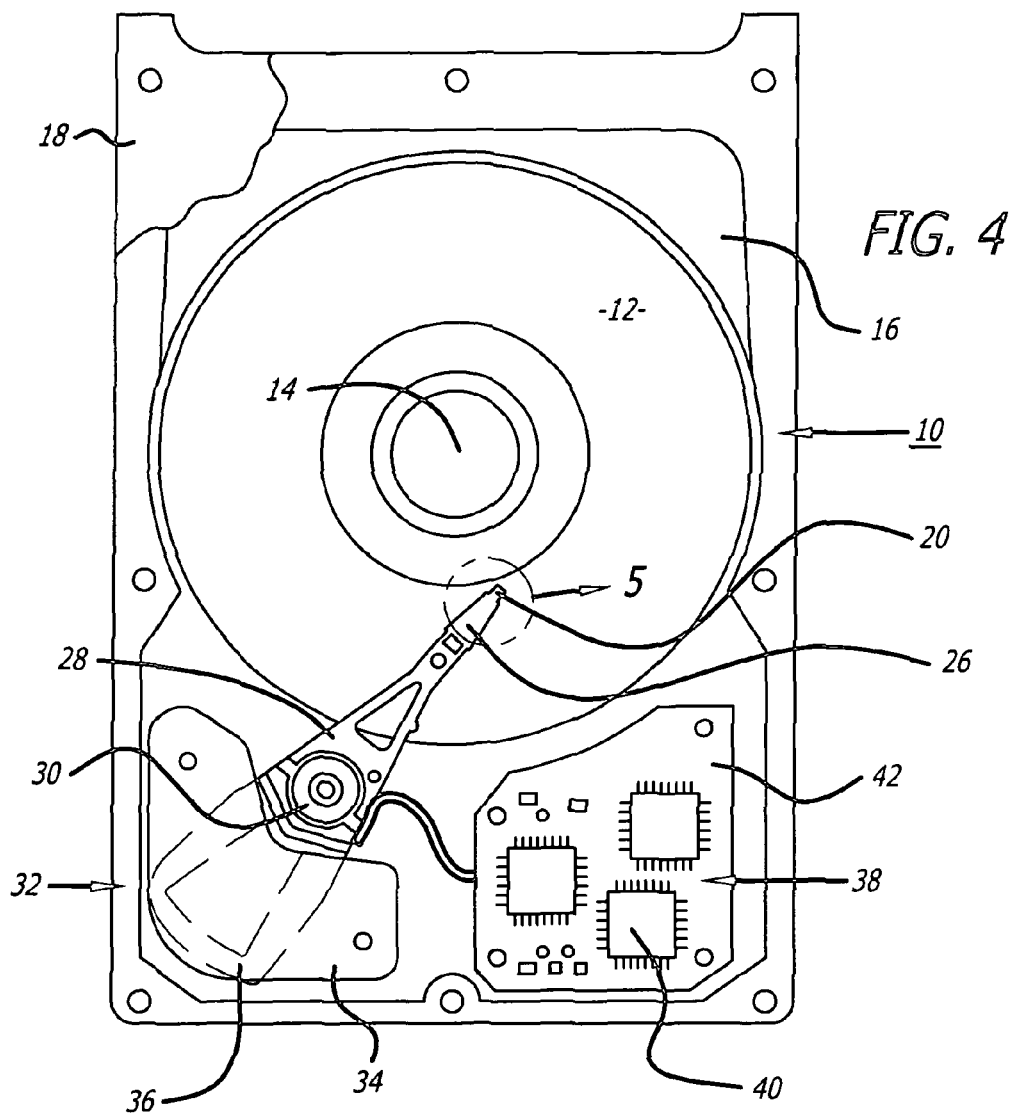
FIG. 4 is a top view of an embodiment of a hard disk drive.

Referring to the drawings more particularly by reference numbers, FIG. 4 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 5:
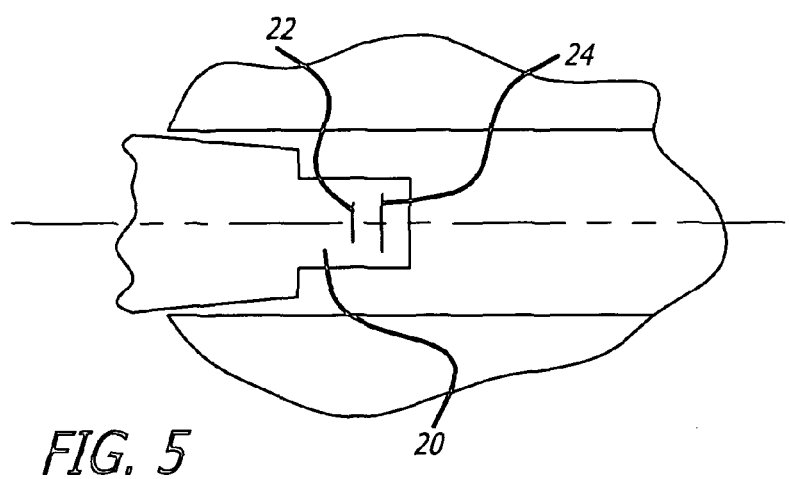
FIG. 5 is a top enlarged view of a head of the hard disk drive.

The disk drive 10 may include a plurality of heads 20 located adjacent to the disks 12. As shown in FIG. 5 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 4, each head 20 may be gimbal mounted to a flexure arm 26 as part of a head gimbal assembly (HGA).

The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 6:
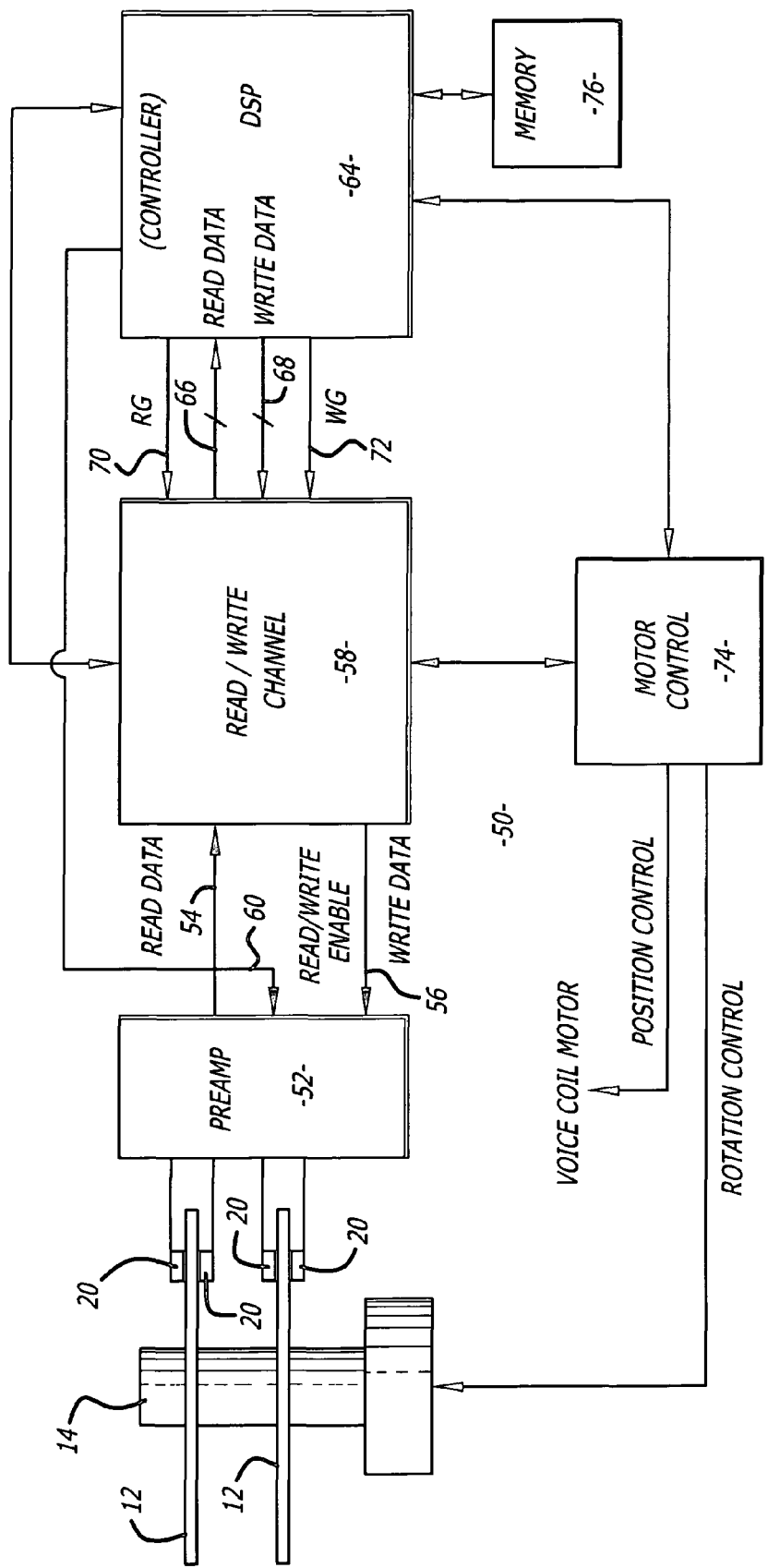
FIG. 6 is a schematic of an electrical circuit for the hard disk drive.

FIG. 6 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 7:
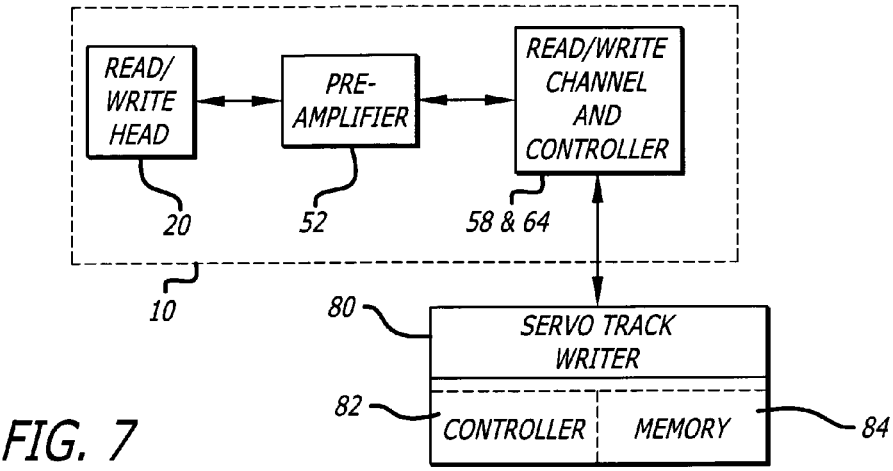
FIG. 7 is a schematic showing a servo writer connected to the hard disk drive.

During the manufacturing process of the disk drive 10 servo information must be written onto the disks 12. This is typically done with a servo track writer 80. FIG. 7 shows a servo track writer 80 connected to a hard disk drive 10. The servo track writer 80 may include a controller 82, memory 84 and other circuitry for writing servo information onto the disk(s) of the disk drive. The servo writer 80 may utilize the pre-amplifier, read/write channel, etc. of the disk drive to write servo information. The servo writer 80 may also employ the circuits of the disk drive to read servo information and position a head onto a track of the disk(s).

Figure 1:
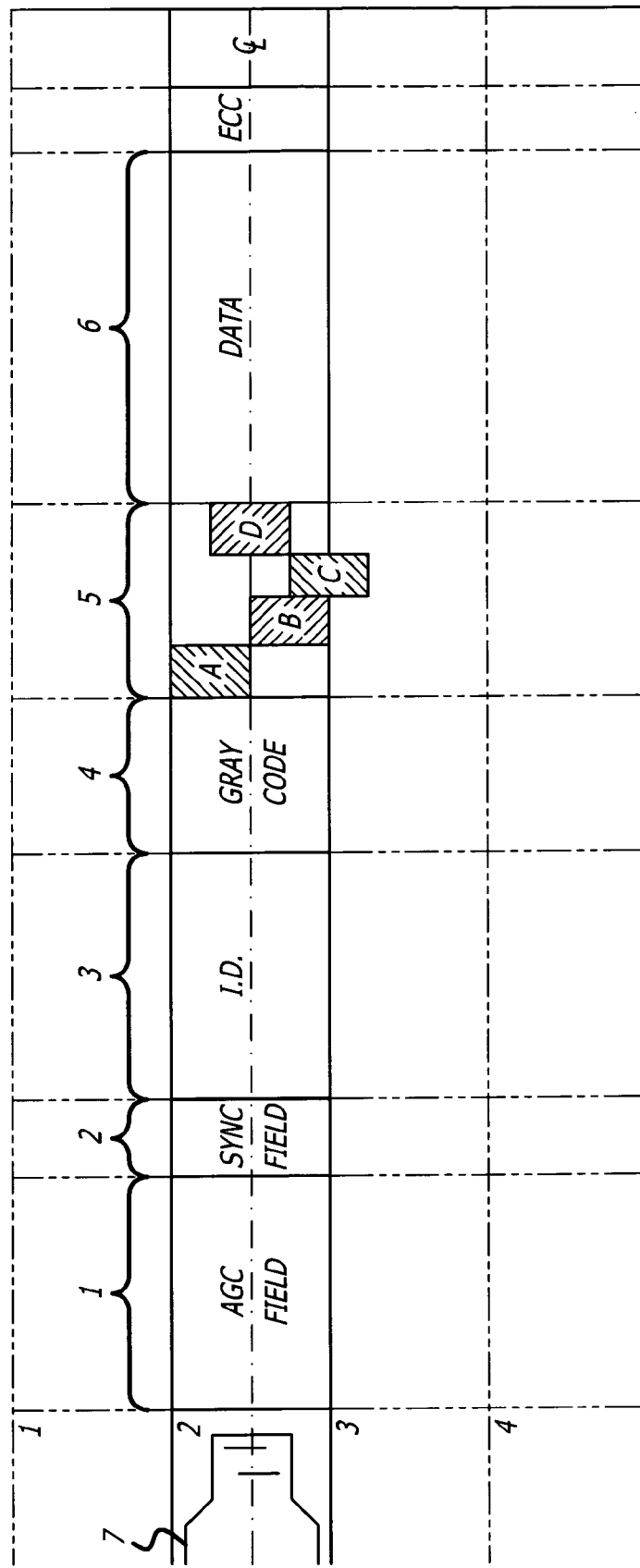
FIG. 1 is an illustration of a track of the prior art.
Figure 2:
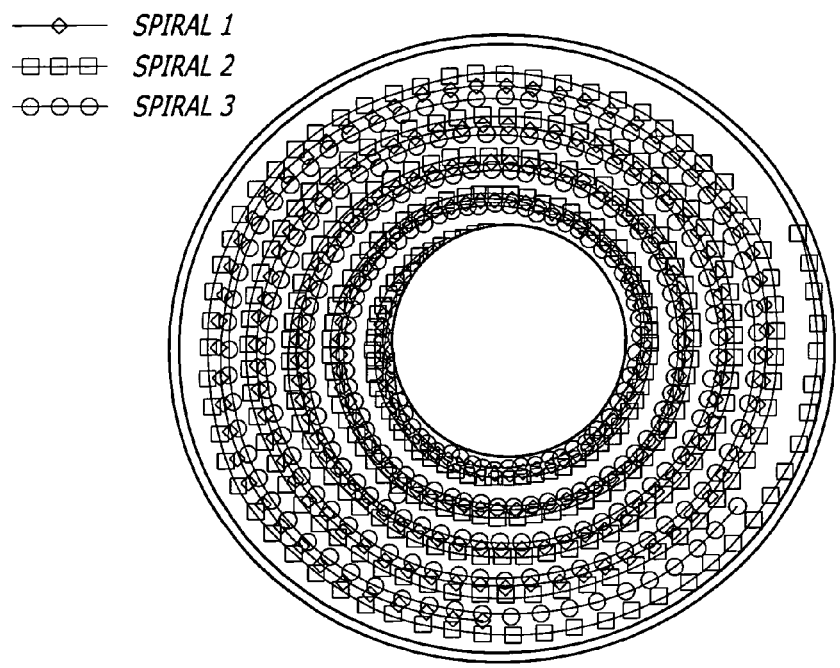
FIG. 2 is an illustration showing a plurality of spiral servo tracks written onto a disk in the prior art.
Figure 3:
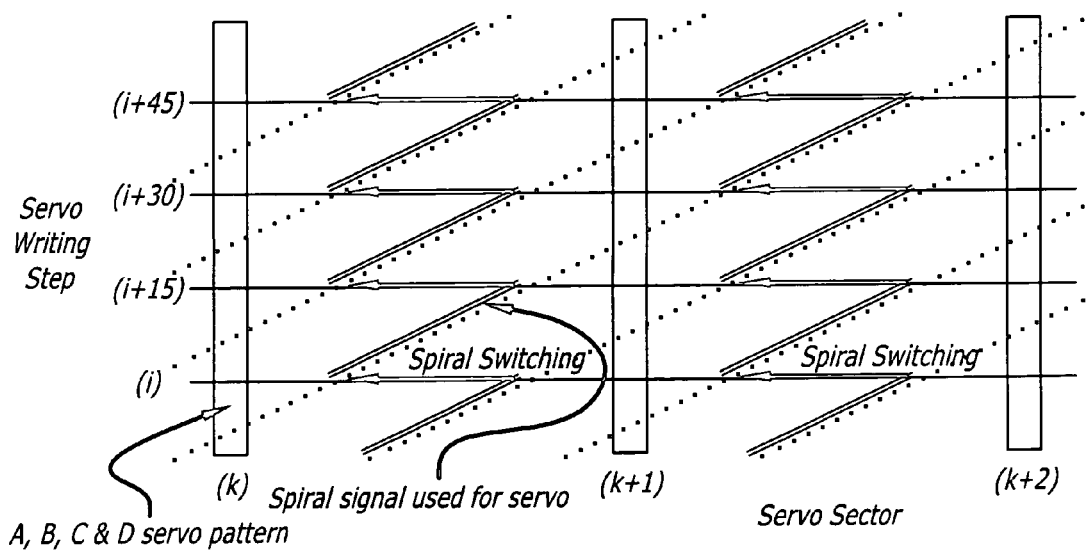
FIG. 3 is an illustration showing a plurality of spiral servo patterns used to write A, B, C and D servo bit patterns in the prior art.
Figure 8:
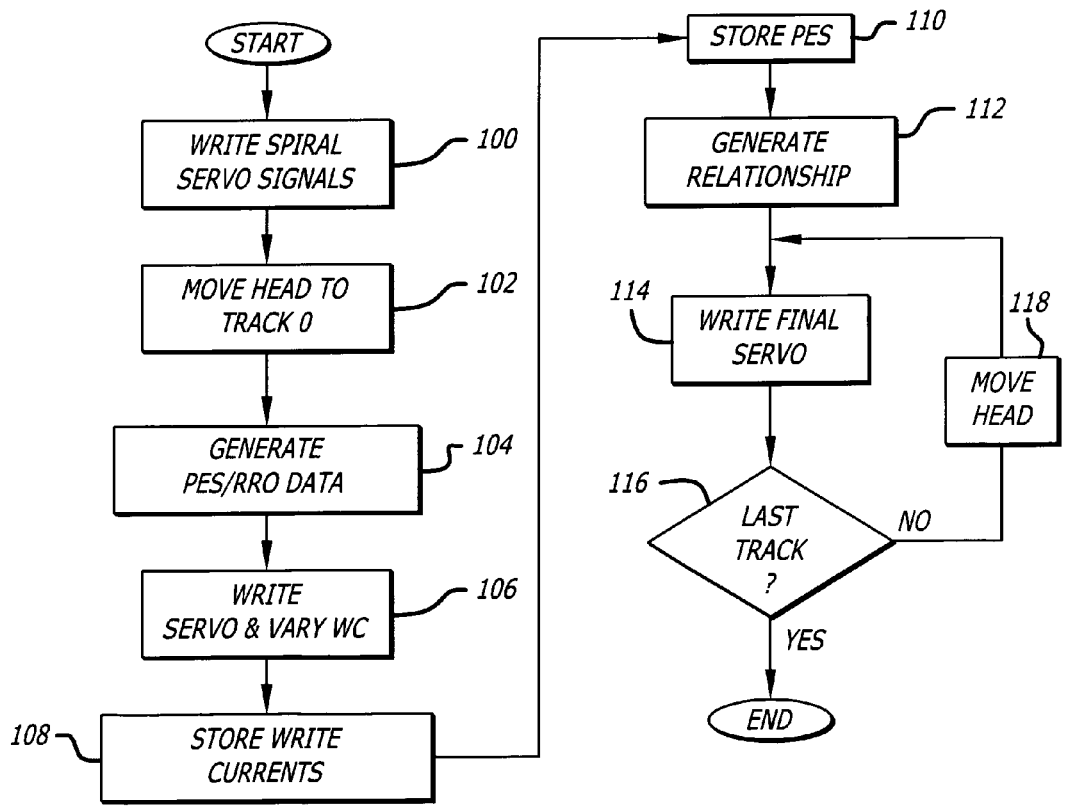
FIG. 8 is a flowchart describing a process to write a servo pattern onto a disk of the drive.

FIG. 8 is a flowchart describing the writing of servo patterns onto the disk(s) with the servo track writer. In block 100 the servo writer causes the disk drive to write a plurality of spiral servo signals such as the pattern shown in FIGS. 2 and 3. The writing of spiral servo signals may the same or similar to the process described in U.S. Pat. No. 5,668,679 issued to Swearingen et al., which is hereby incorporated by reference.

In block 102 the servo writer causes the head to move to track 0. In block 104 the servo writer can read the spiral servo signals and generate a position error signal ("PES"). The PES may actually be an average PES value calculated from a number of PES values generated during one revolution of the disk. The generation of the PES signal can be the same or similar to a process described in U.S. Pat. No. 6,049,440 issued to Shu, which is hereby incorporated by reference.

Figure 9:
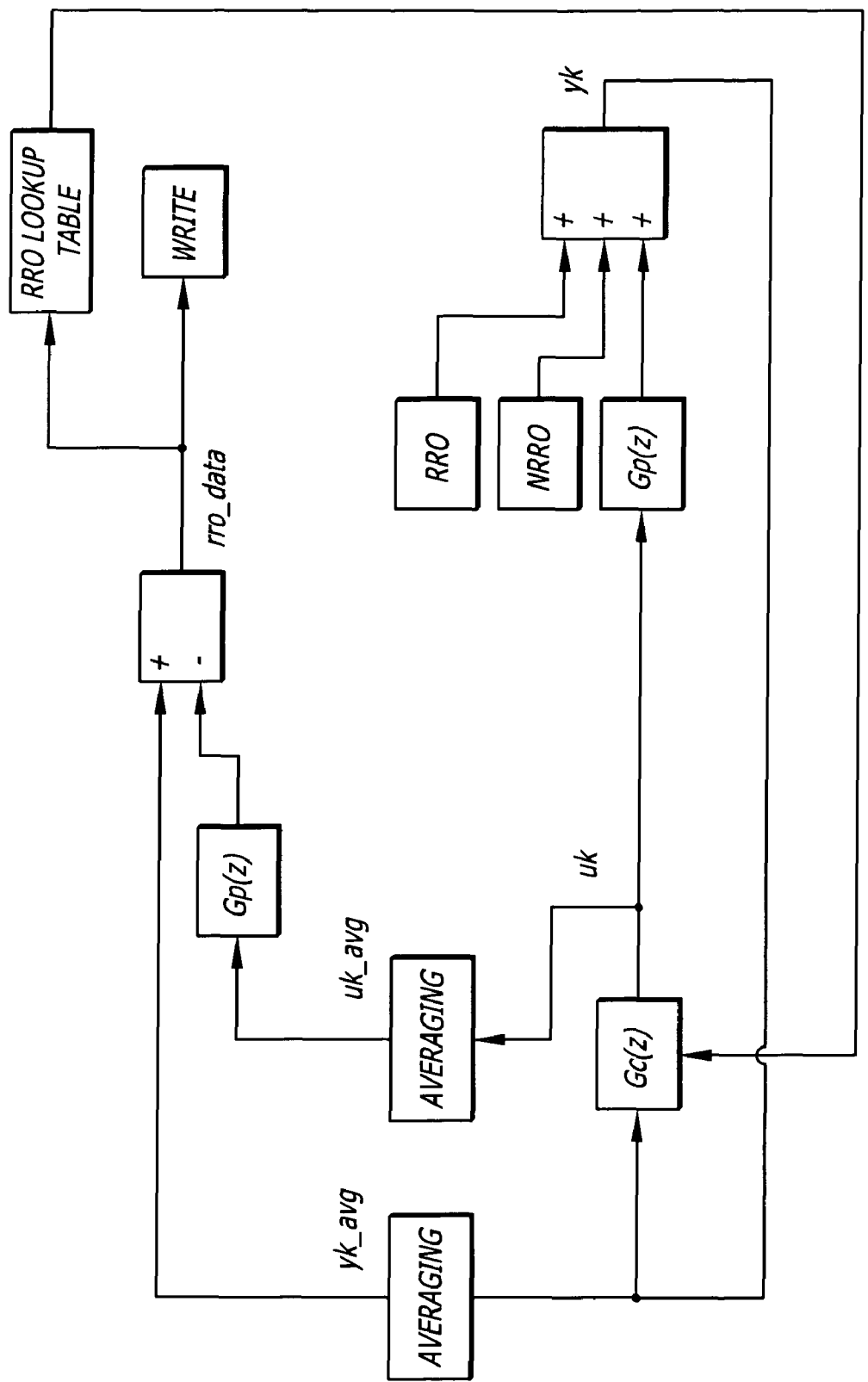
FIG. 9 is a diagram of a servo control loop.

The PES signals for repeatable runout RRO can be generated and corrected using the servo loop shown in FIG. 9 and described by the following equations;

$$rro_{(z)} = yk_{AVG}(z) - G_{(p)} \mu k_{AVG}(z) \quad (1)$$

where;
$G_{c(z)}$=the transfer function of the controller,
$G_{p(z)}$=the transfer function of the plant dynamics,
yk=the position error signal (PES),
rro=the repeatable runout on the disk,
$rro_{(z)}$=the corrected RRO data.

The following equation can be used to iteratively update the RRO data:

$$rcd_{k+1}(i) = rcd_k(i) + \lambda * rro(i), 0 \leq i \leq \text{servo\_sector\_max} \quad (2)$$

where $\lambda$ (0, 1, 2 . . . ) is n update constant.

In block 106, a plurality of servo patterns are written for a plurality of test tracks. The write current is varied for various servo patterns. For example, the write current WC can be varied for each nth spoke of the disk servo patterns (eg. every 16th spoke). The write current for the other spokes can be set at a normal setting. The write currents are stored in block 108

In block 110 position error signals (PES) are measured and stored for the test tracks. In block 112 A PES versus write current relationship ("PES/WC relationship") is determined from the measured PES signals and stored write currents.

In block 114, a plurality of final servo patterns of a track are written using final PES information measured or predicted from the spiral servo signals. The write current is varied based on the measured/predicted PES signal and the PES/WC relationship. In decision block 116, it is determined whether the last track has been written. If not, the head is moved to the next track position in block 118 and the process returns to block 114. The process is terminated if the last track has been written. The tracks can be written in a partially overlapping manner.

The write current determines the trailing edge of the final servo bits and the position of the track center. Utilizing the PES/WC relationship allows the system to rapidly vary the write current and change the track center. For example, the track center can be adjusted within a fraction of a revolution of the disk. As a specific example, the write current can be ramped up at the beginning, and down at the end, of a multiple-revolution writing sequence to avoid step-changes in written position associated with the start or end of the write sequence.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for writing servo information onto a disk of a hard disk drive, comprising:
writing a plurality of spiral servo signals with a head, the spiral servo signals are used to write servo patterns;
generating position error signals from the spiral servo signals;
writing a plurality of servo patterns utilizing the position error signals, a write current of the head being varied for at least one servo pattern;
determining a PES versus WC relationship between the position error signals and the write current; and,
writing a plurality of final servo patterns by utilizing the PES versus WC relationship and varying the write current.

2. The method of claim 1, wherein the write current is varied for every nth spoke of the spiral servo signals.

3. The method of claim 1, wherein a plurality of tracks are written and the tracks are partially overlapped.

4. The method of claim 1, wherein the write current is varied in accordance with a final position error signal and the PES versus WC relationship.

5. The method of claim 1, wherein the position error signals account for repeatable runout.

6. A servo writer that writes servo information onto a disk of a hard disk drive, comprising:
   a controller that causes a writing of a plurality of spiral servo signals with a head, the spiral servo signals are used to write servo patterns; a generation of position error signals from the spiral servo signals; a writing of a plurality of servo patterns utilizing the position error signals, wherein a write current of the head is varied for at least one servo pattern; a determination of a PES versus WC relationship between the position error signals and the write current; and, a writing of a plurality of final servo patterns by utilizing the PES versus WC relationship and varying the write current.

7. The servo writer of claim 6, wherein the write current is varied for every nth spoke of the spiral servo signals.

8. The servo writer of claim 6, wherein a plurality of tracks are written and the tracks are partially overlapped.

9. The servo writer of claim 6, wherein the write current is varied in accordance with a final position error signal and the PES versus WC relationship.

10. The servo writer of claim 6, wherein the position error signals account for repeatable runout.

* * * * *